US012722854B2

(12) United States Patent
Twyford et al.

(10) Patent No.: US 12,722,854 B2
(45) Date of Patent: Sep. 1, 2026

(54) PACKAGING FOR USE WITH UNCREWED AERIAL VEHICLE

(71) Applicant: Wing Aviation LLC, Palo Alto, CA (US)

(72) Inventors: Evan Scott Twyford, Houston, TX (US); Jasper Lee Lewin, Santa Cruz, CA (US); Elizabeth Chase Marshman, San Francisco, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

(21) Appl. No.: 18/912,128

(22) Filed: Oct. 10, 2024

(65) Prior Publication Data

US 2025/0115395 A1 Apr. 10, 2025

Related U.S. Application Data

(60) Provisional application No. 63/589,305, filed on Oct. 10, 2023.

(51) Int. Cl.

| | |
|---|---|
| ***B65D 25/22*** | (2006.01) |
| ***B65D 33/06*** | (2006.01) |
| *B64U 101/66* | (2023.01) |
| *B64U 101/67* | (2023.01) |

(52) U.S. Cl.
CPC ............ *B65D 25/22* (2013.01); *B65D 33/06* (2013.01); *B64U 2101/66* (2023.01); *B64U 2101/67* (2023.01)

(58) Field of Classification Search
CPC ...... B65D 25/22; B65D 33/06; B65D 5/2023; B65D 33/14; B64U 2101/66; B64U 2101/67; B64U 2101/64
See application file for complete search history.

(56) References Cited

U.S. PATENT DOCUMENTS

| | | | | |
|---|---|---|---|---|
| 10,035,623 | B1 | 7/2018 | Prager | |
| 10,131,428 | B1 | 11/2018 | Sopper | |
| 10,301,024 | B1 | 5/2019 | Sopper | |
| 2005/0072418 | A1* | 4/2005 | McGowan | A47J 37/129 99/403 |
| 2017/0106978 | A1* | 4/2017 | Sopper | B65D 31/16 |
| 2018/0072418 | A1* | 3/2018 | Shannon | B64D 1/22 |
| 2019/0047707 | A1 | 2/2019 | Sopper | |
| 2019/0308801 | A1* | 10/2019 | Marias Albrich | B65D 81/263 |
| 2024/0010336 | A1* | 1/2024 | Wyrobek | G05D 1/102 |
| 2024/0150016 | A1* | 5/2024 | Prager | B64C 39/024 |

* cited by examiner

*Primary Examiner* — Shawn M Braden
(74) *Attorney, Agent, or Firm* — McDonnell Boehnen Hulbert & Berghoff LLP

(57) ABSTRACT

A package adapted for use with an uncrewed aerial vehicle (UAV) is provided. The package forms a container and has a handle at the top. Embodiments of the package include features for efficient manufacturing and storage.

18 Claims, 18 Drawing Sheets

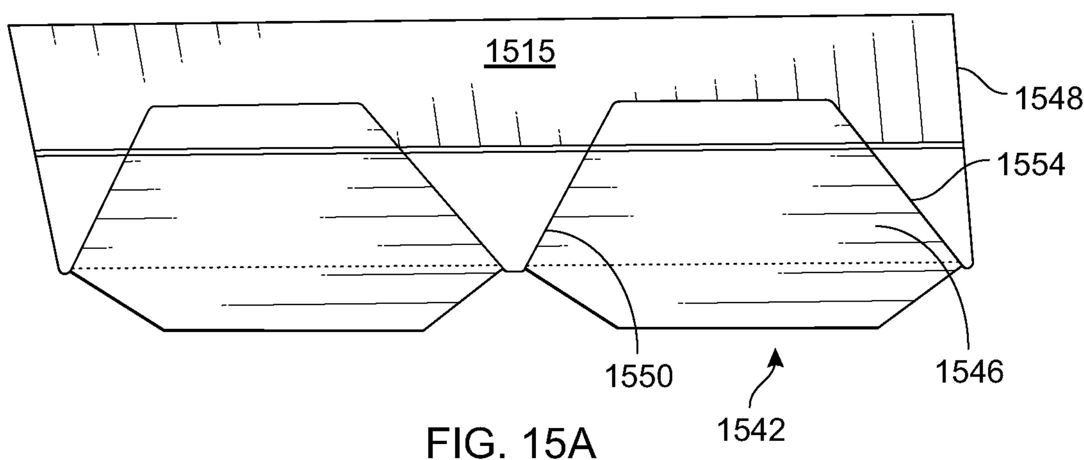
FIG. 15A
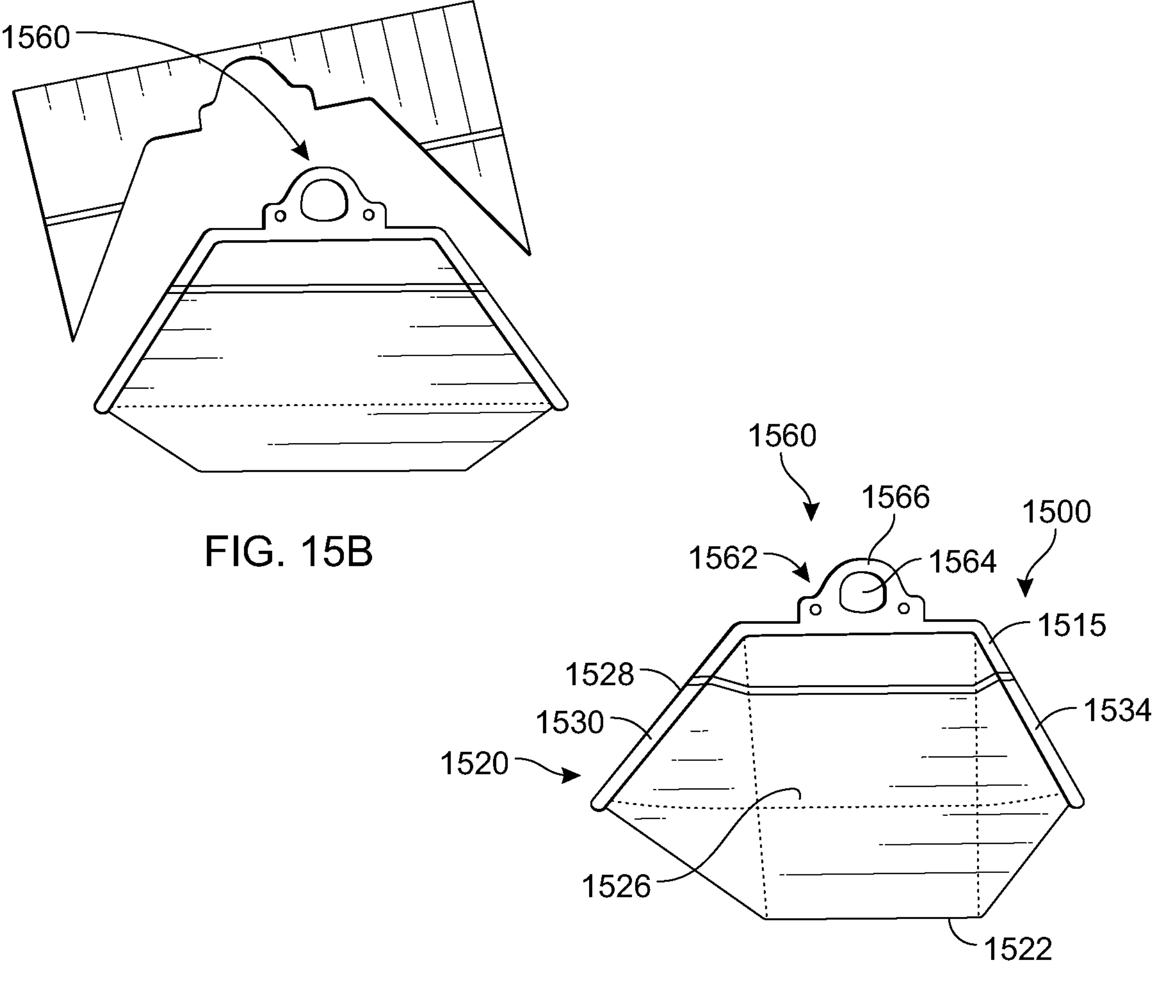
FIG. 15B
FIG. 15C

PACKAGING FOR USE WITH UNCREWED AERIAL VEHICLE

CROSS-REFERENCE TO RELATED APPLICATION

This application claims priority to U.S. Provisional Patent Application No. 63/589,305, filed Oct. 10, 2023, which is incorporated herein by reference in its entirety.

BACKGROUND

An uncrewed vehicle, which may also be referred to as an autonomous vehicle, is a vehicle capable of travel without a physically-present human operator. The term "unmanned" may sometimes be used instead of, or in addition to, "uncrewed," and it should be understood that both terms have the same meaning, and may be used interchangeably. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation way-points, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter UAVs, among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

The present embodiments are directed to a package configured to be secured by a component of the UAV, such as a payload retriever. With the package secured to the UAV, the payload can be safely transported, or can be raised and lowered by manipulating a tether attached to the payload retriever.

In one aspect a package adapted for use with an uncrewed aerial vehicle (UAV) is provided. The package includes a folded sheet of material that forms a container having an open configuration and a closed configuration. The container includes a bottom, a first side, a second side, a front, and a back. A handle is disposed at the top of the first side. The handle includes a handle opening and a bridge extending over the handle opening. In the open configuration the first side, second side, front, and back form an opening opposite the bottom, the first side and second side are angled away from one another from the bottom toward the opening, and the front and back are angled away from one another from the bottom toward the opening, such that the container is nestable with another container having the same configuration. In the closed configuration the first side and second side are angled toward one another so as to surround an interior space in the container, the front extends to a front tip, and the rear extends to a rear tip.

In another aspect another package adapted for use with an uncrewed aerial vehicle (UAV) is provided. The package includes a container including a bottom wall, a side wall, and a plurality of flaps extending up from the side wall. The side wall includes a lower end that surrounds a perimeter of the bottom wall. The side wall extends up from the bottom wall so as to form an interior of the container. The plurality of flap are adapted to form a closed vaulted top that covers the interior of the container. A portion of the interior of the container extends into the closed vaulted top. A handle is disposed at a top of a first flap of the plurality of flaps. The handle includes a handle opening and a bridge extending over the handle opening.

In another aspect yet another package adapted for use with an uncrewed aerial vehicle (UAV) is provided. The package includes a pouch having a top, a bottom, a first side, a second side, a first edge, and a second edge. The pouch is formed of a sheet of a flexible first material that is folded to form a first layer, a second layer, and a folded end. The first layer forms the first side, the second layer forms the second side, and the folded end forms the bottom of the pouch. The first and second layers are sealed along the first edge to form a first seam, and the first and second layers are sealed along the second edge to form a second seam. The pouch includes an opening at the top. The package also includes a hanger having a base, and a handle extending up from the base. The handle includes a handle opening and a bridge that extends over the handle opening, where the bridge is configured to be secured by a component of the UAV. The hanger is formed by a plurality of sealed layers including the first layer and the second layer.

In another aspect still another package adapted for use with an uncrewed aerial vehicle (UAV) is provided. The package includes a container including a first portion having a concave side that forms an interior area, a convex side, and a first edge extending around an opening to the interior area. The first edge is disposed in a first plane. The container also includes a film covering the opening to the interior area and secured to the first edge. A handle is disposed at a top of the first portion of the container. The handle includes a handle opening and a bridge extending over the handle opening.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 15A illustrates a folded sheet during a method of making a package according to an example embodiment.

FIG. 15B illustrates the folded sheet of FIG. 15A during another step of making the package.

FIG. 15C is a perspective view of the package made in the steps of FIGS. 15A and 15B.

DETAILED DESCRIPTION

Figure 1A:
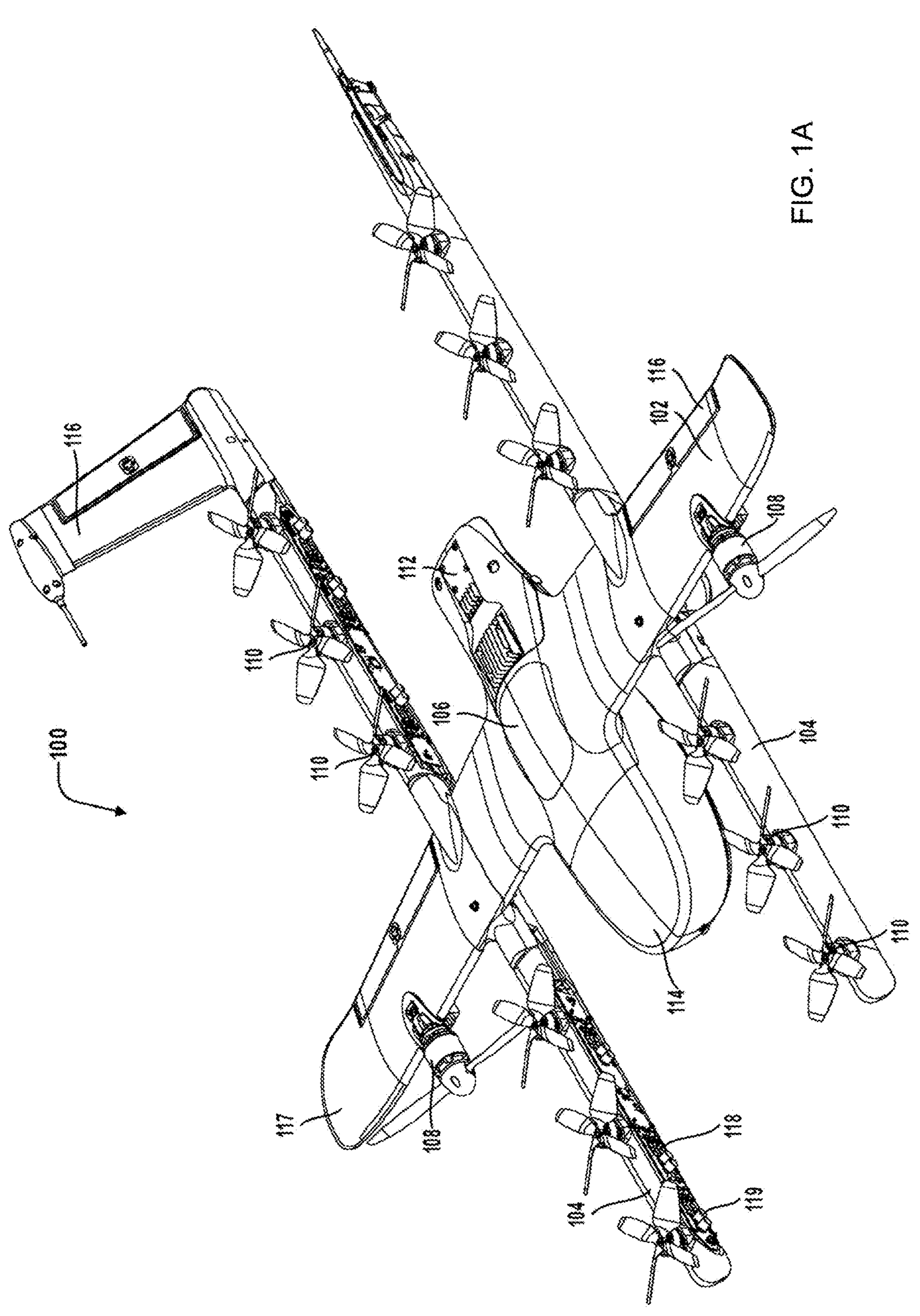
FIG. 1A is a simplified illustration of an uncrewed aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments are related to the use of uncrewed aerial vehicles (UAVs) or uncrewed aerial systems (UASs) (referred to collectively herein as UAVs) that are used to carry a package to be delivered or retrieved. As examples, UAVs may be used to deliver or retrieve a package to or from an individual or business. In operation the package to be delivered is secured to the UAV and the UAV is then flown to the desired delivery site. The package may be secured beneath the UAV, positioned within the UAV, or positioned partially within the UAV, as the UAV flies to the delivery site. Once the UAV arrives at the delivery site, the UAV may land to deliver the package, or may be operated in a hover mode while the package is dropped or lowered from the UAV towards the delivery site using a tether and a winch mechanism positioned within the UAV.

The package may enclose a payload, such as goods that are to be delivered by the UAV. The package may protect the goods enclosed therein from weather, dirt, impacts, and other adverse conditions. In some instances, the package may be designed with various features that are intended for securing the package to the UAV and for protecting the goods during flight. Described herein are various embodiments of packages that are adapted to be carried and delivered by a UAV.

In some embodiments, the package includes a container formed of a folded sheet of material. The container has an open configuration and a closed configuration. In the open configuration the sides, front, and rear of the package taper outward so that the container is nestable inside another container with the same shape. In the closed configuration, the sides are angled toward one another to surround an interior space in the, while the front and back extend to respective tips. A handle for securing the package to a UAV is disposed at the top of one of the sides of the container.

In some embodiments, the package includes a container that has a bucket configuration including a bottom wall and a side wall that surrounds the bottom wall. A plurality of flaps extend up from the side wall and are adapted to form a closed vaulted top that covers the interior space of the container. A handle for securing the package to a UAV is disposed at the top of one of the flaps.

In some embodiments, the package includes a pouch formed of folded flexible material that is folded to form first and second layers that provide respective sides of the pouch. The package also includes a hanger at the top of the pouch. The hanger includes a base and a handle extending over the base to form a handle opening. The hanger is formed from a plurality of sealed layers including the first layer and the second layer.

In some embodiments, the package includes a container having a first portion and a seal that covers an opening to the first portion. The first portion includes a concave side that forms an interior area, a convex side, and an edge extending around an opening to the interior area. The film is secured to the edge to close the interior area. A handle for securing the package to a UAV is disposed at the top of the first portion of the container.

Further details and other embodiments of packages according to the disclosure are described in more detail below.

II. Illustrative Uncrewed Vehicles

Herein, the terms "uncrewed aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
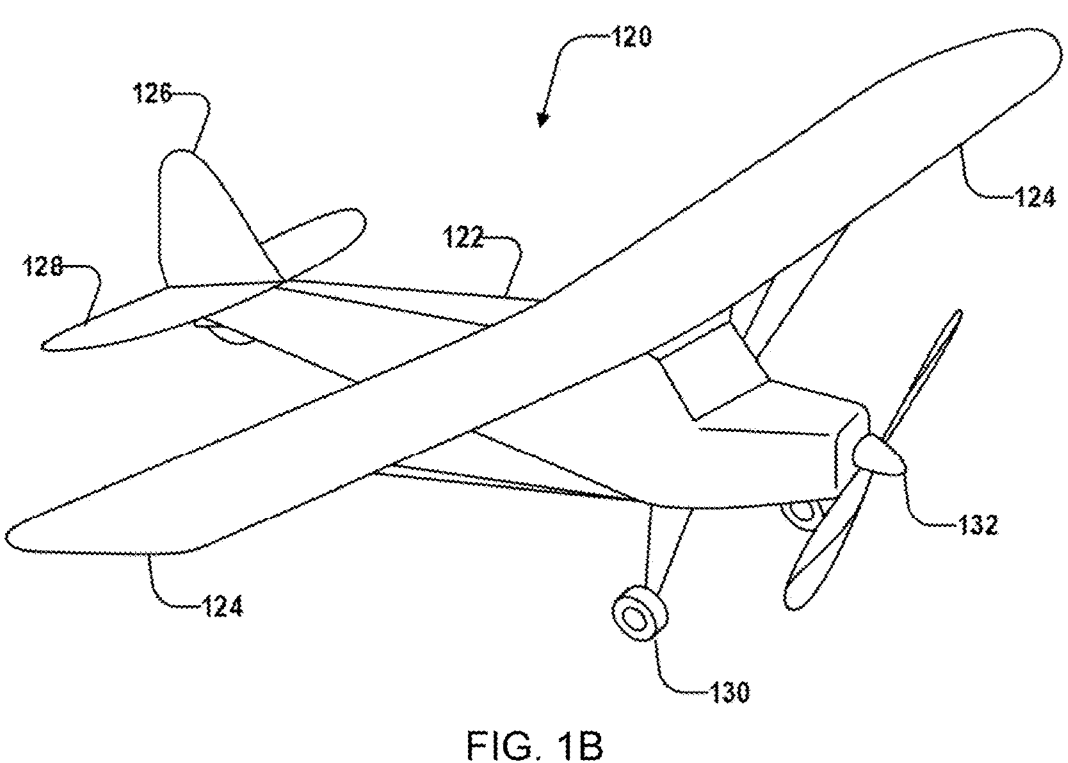
FIG. 1B is a simplified illustration of an uncrewed aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
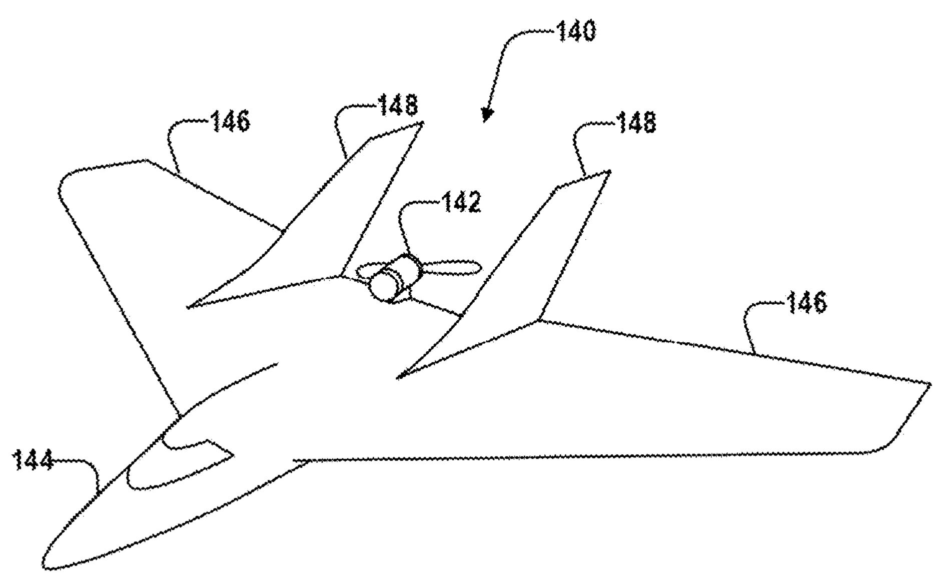
FIG. 1C is a simplified illustration of an uncrewed aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
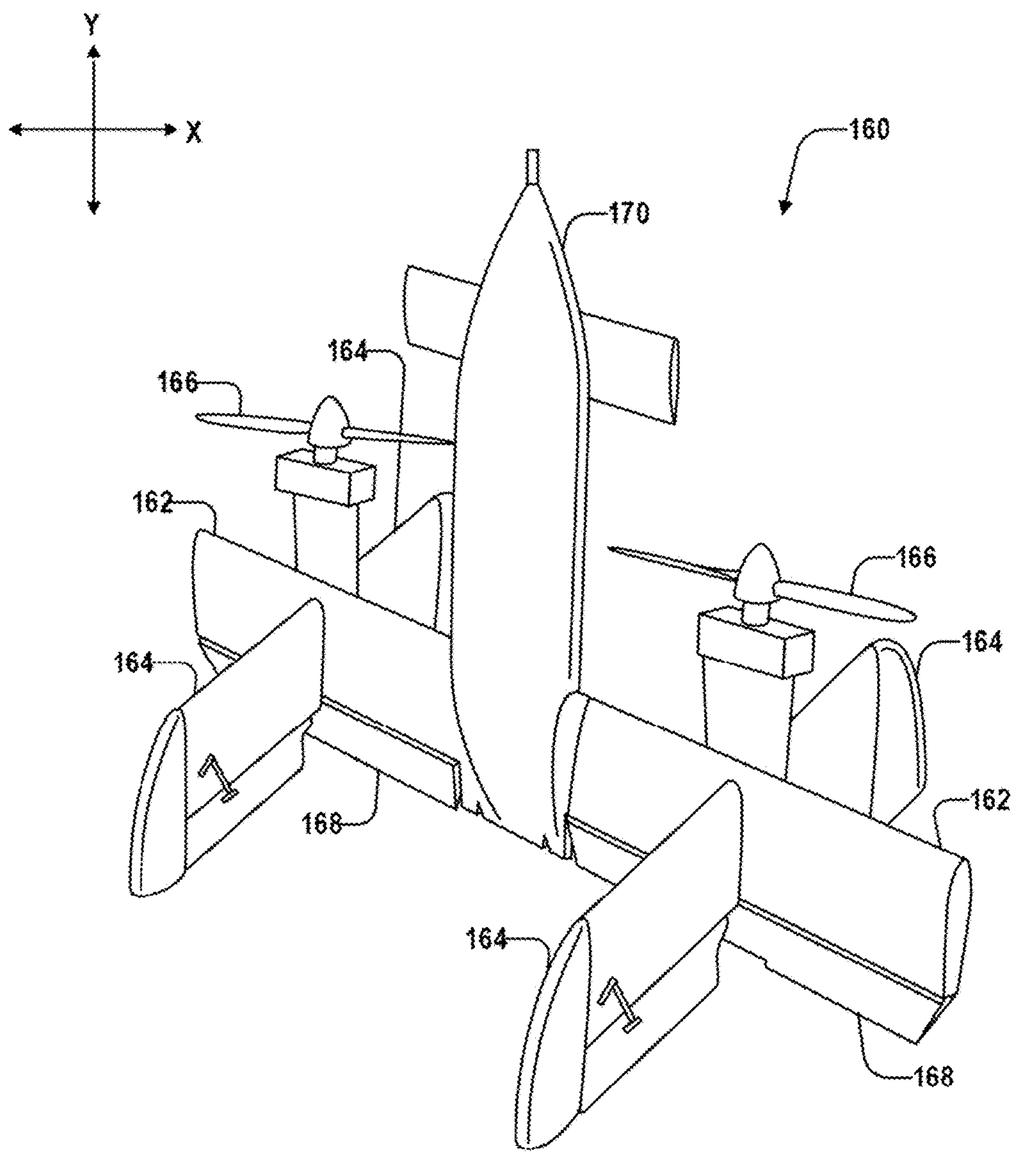
FIG. 1D is a simplified illustration of an uncrewed aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
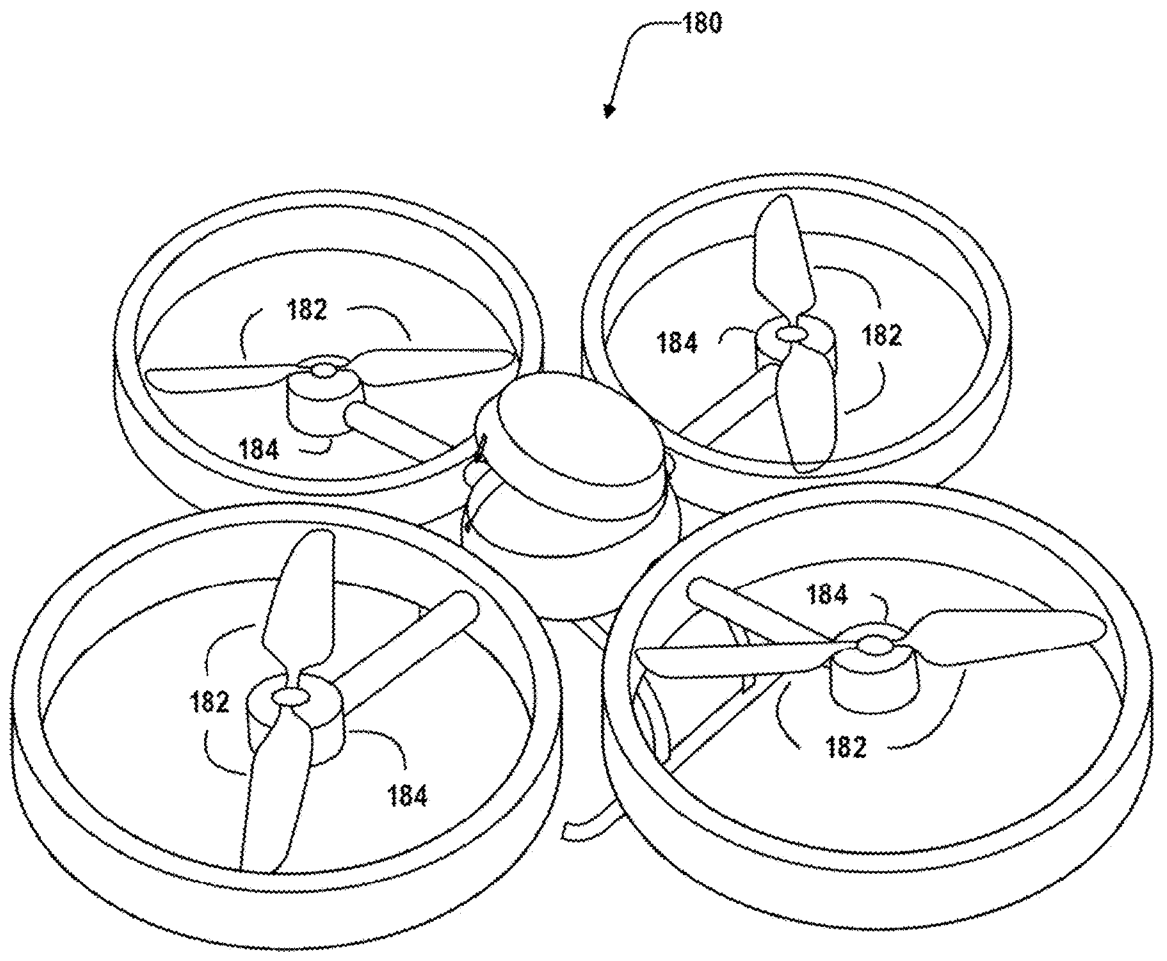
FIG. 1E is a simplified illustration of an uncrewed aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Illustrative UAV Components

Figure 2:
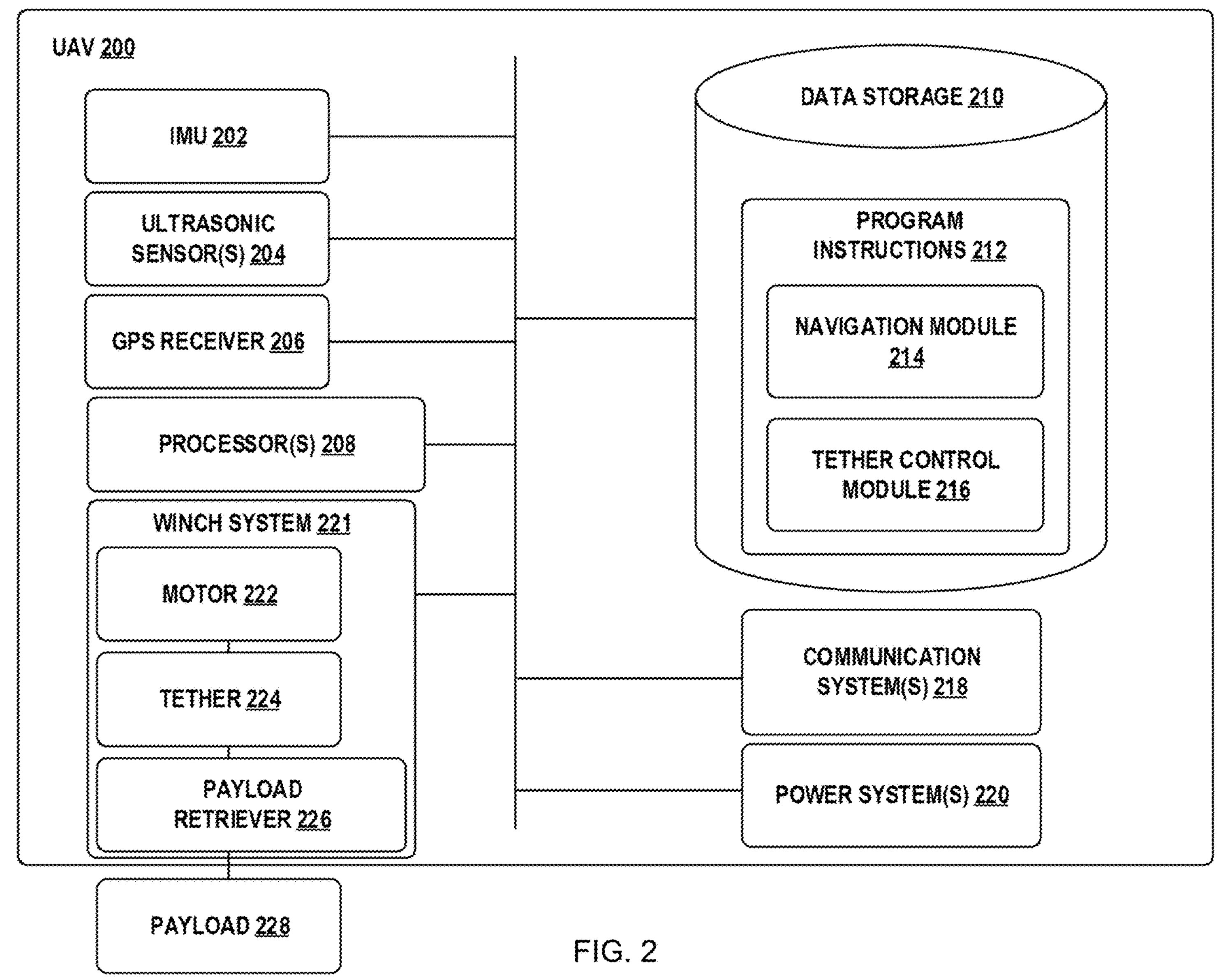
FIG. 2 is a simplified block diagram illustrating components of an uncrewed aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
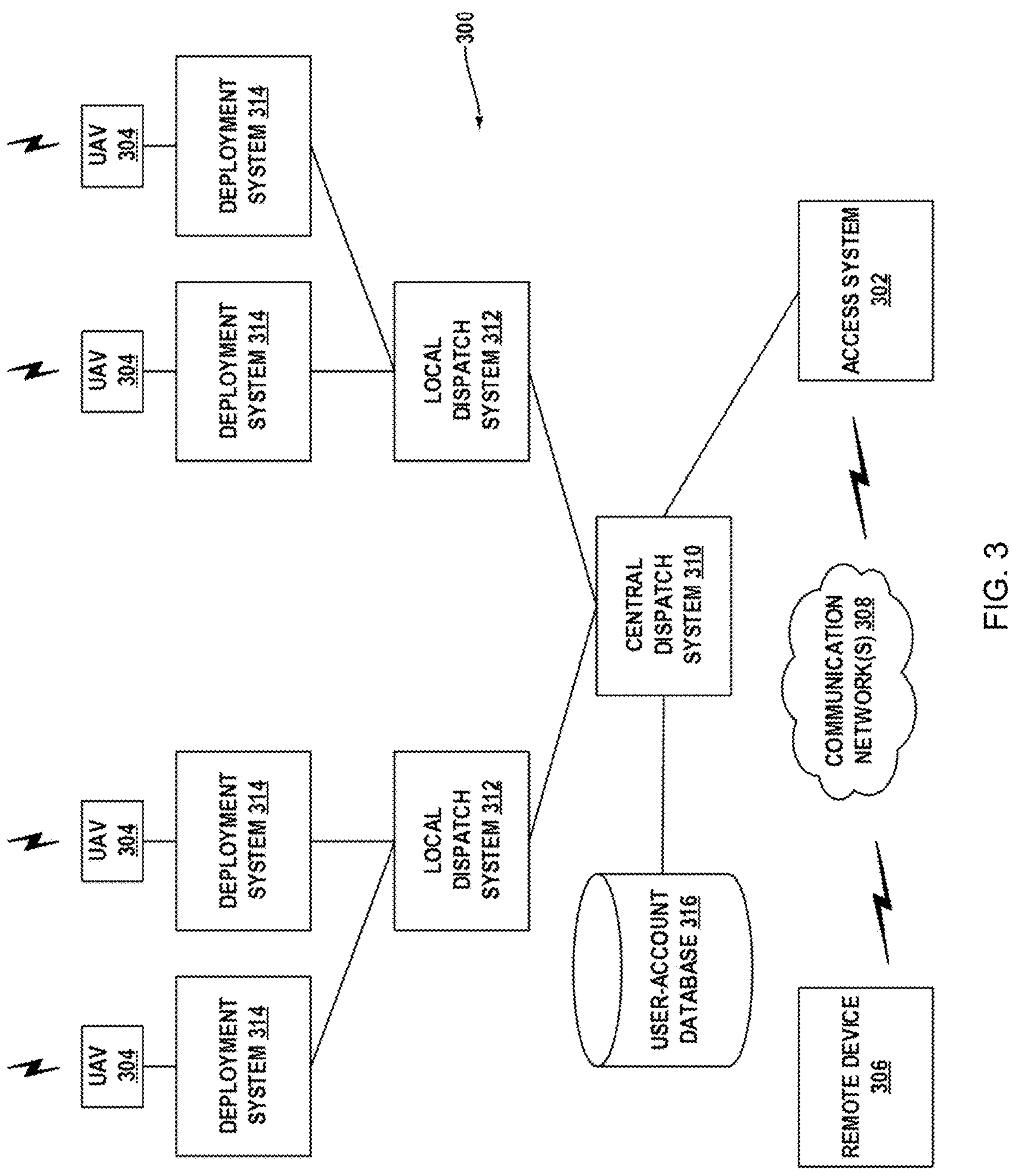
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example UAV Packaging

Figure 4:
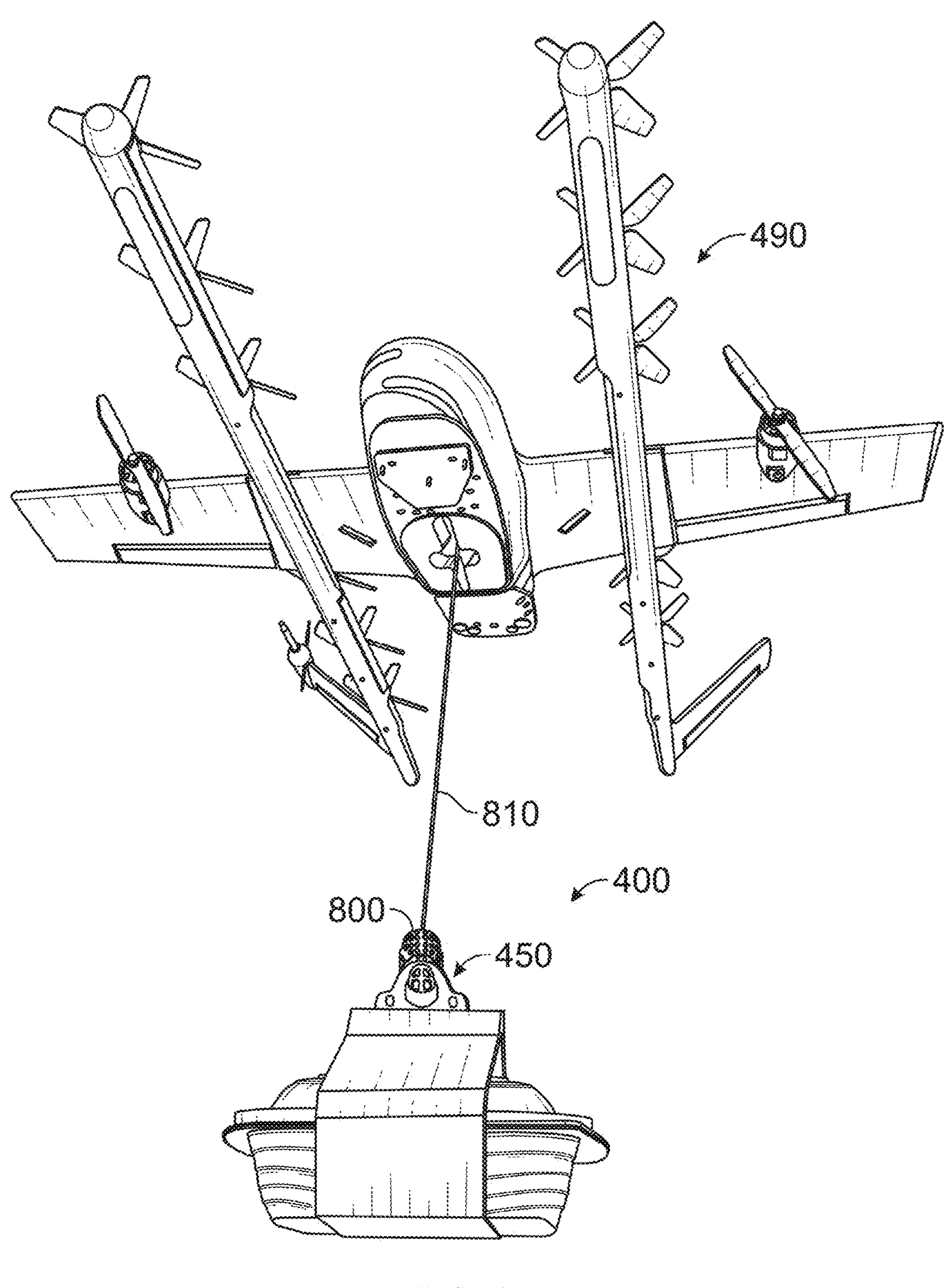
FIG. 4 is a lower perspective view of a UAV carrying a package, according to an example embodiment.

When a UAV is assigned to transport a payload, securing the payload inside of a package that is specifically configured to be received and carried by a UAV can help reduce the likelihood that the package may be dropped, may break, or may substantially increase the drag on the UAV. FIG. 4 illustrates a package 400 according to an embodiment of the disclosure being carried by a UAV 490. The package 400 includes a hanger 450 that is secured to a payload retriever 800 of the UAV 490. The payload retriever 800 is secured to a distal end of a tether 810, which extends from the UAV 490. The UAV 490 is operable to retract or extend the tether 810 in order to raise or lower the package 400.

Figure 5:
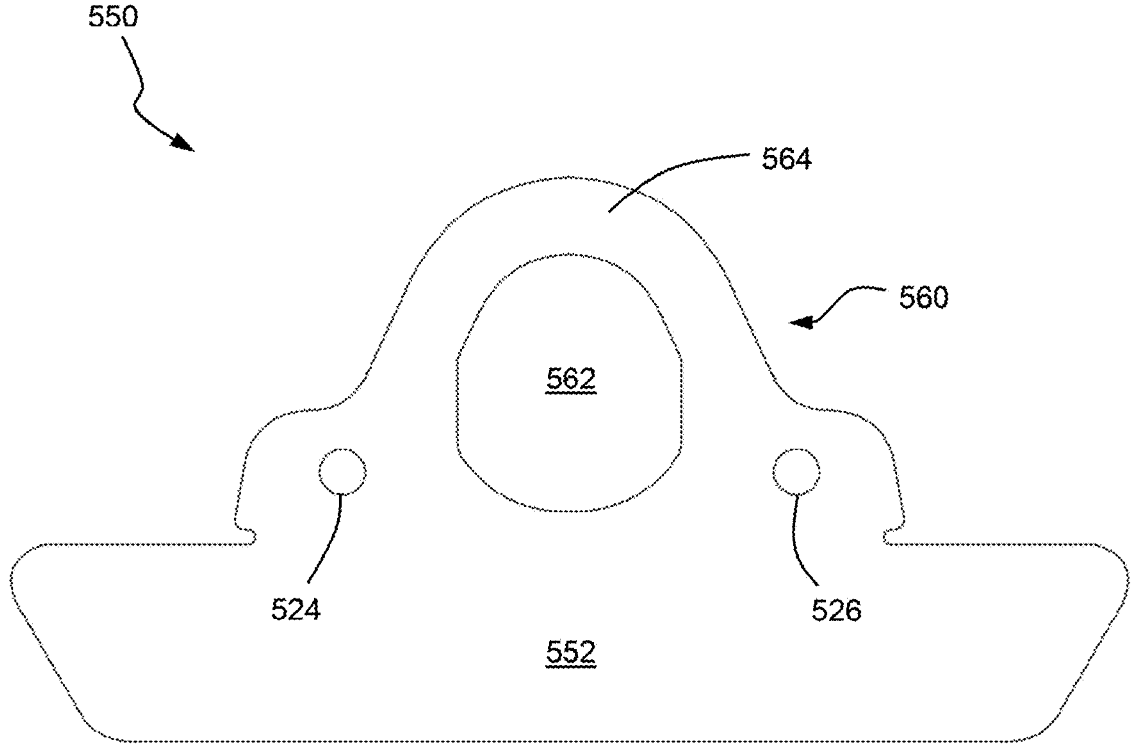
FIG. 5 is a side view of a hanger of a package, according to an example embodiment.

FIG. 5 is a side view of an example hanger 550 which may form part of a package in accordance with the disclosure. configured to be secured to a strap to form a package coupling apparatus according to an embodiment of the disclosure. The hanger 550 may include a handle 560 formed by a bridge 564 that extends over a handle opening 562. In addition, the hanger 550 may also include a base 552 that extends past the ends of the handle 560 and is configured to couple the hanger 550 to portions of the package that contain or support a payload. The hanger 550 may also include holes 524, 526 that are configured to receive locking pins for securing the package to a component or structure outfitted with such pins. For example, the holes 524 and 526 may be configured to receive locking pins positioned within the fuselage of a UAV to secure the hanger 550 and payload in a secure position during high speed forward flight to a delivery location. In addition, holes 524 and 526 may also be designed for pins of a payload holder to extend therethrough to hold the package in position for retrieval on a payload retrieval apparatus. The hanger may be comprised of a thin, plastic material that is flexible and provides sufficient strength to suspend the package beneath a UAV during forward flight to a delivery site, and during delivery and/or retrieval of the package. In practice, the hanger may be bent to position the handle within a slot of a payload retriever.

The example hanger 550 shown in FIG. 5 includes a larger handle opening 562 for a payload retriever and two smaller holes 524, 526 for locking pins, as described in more detail below. In other embodiments, however, the hanger may include fewer or more apertures. For example, in some embodiments, the hanger may include only a single larger handle opening that is sized for a payload retriever. In such a case, a payload retriever may be configured to receive the handle in order to raise and lower a package with respect to a UAV, and the payload retriever alone may be used to secure the package to the UAV. Alternatively, the payload retriever may be used in cooperation with other structures, such as clamps or doors, to secure the package to the UAV. Further, in some embodiments, the handle opening may be sized to receive only a locking pin, and the hanger may not include a larger opening for a payload retriever. In such an embodiment, the UAV may be configured to land to receive a package and either land or drop a package for delivery. For example, such an embodiment may have a configuration similar to that of FIG. 5, with two small holes but without the larger opening. Accordingly, either of the holes may form the handle opening and the material extending over the opening may form the bridge of the handle.

Figures 6A, 6B, 6C:
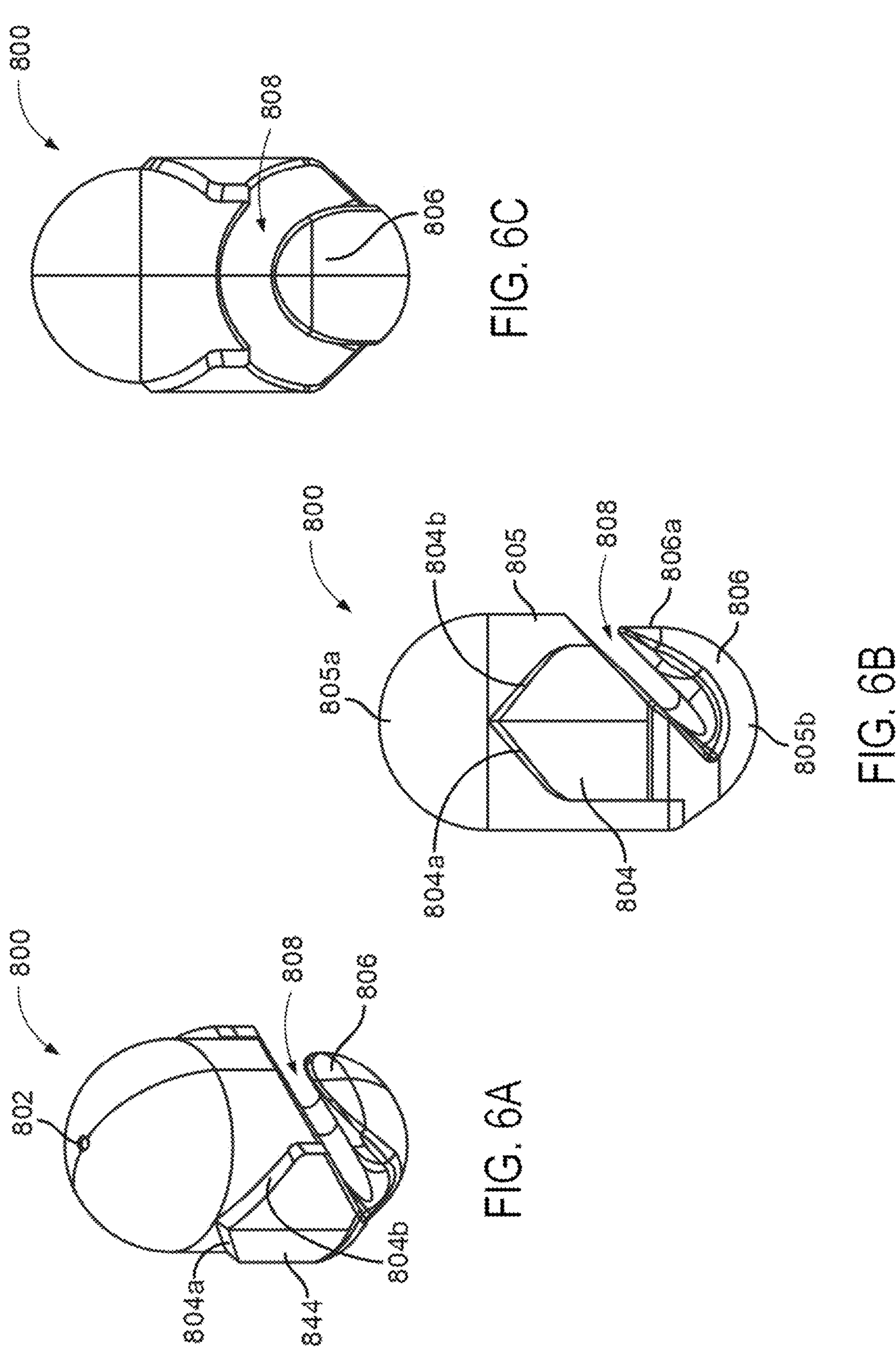
FIG. 6A is a perspective view of a payload retriever, according to an example embodiment.
FIG. 6B is a side view of the payload retriever shown in FIG. 6A.
FIG. 6C is a front view of the payload retriever shown in FIGS. 6A and 6B.

FIG. 6A is a perspective view of a payload retriever 800, according to an example embodiment. Payload retriever 800 includes tether mounting point 802, and a slot 808 to receive a handle of the package coupling apparatus. Lower lip, or hook, 806 is positioned beneath slot 808. Also included is an outer protrusion 804 having helical cam surfaces 804*a* and 804*b* that are adapted to mate with corresponding cam mating surfaces within a payload retriever receptacle positioned within a fuselage of a UAV.

FIG. 6B is a side view of payload retriever 800 shown in FIG. 6A. A slot 808 is shown positioned above a lower lip, or hook, 806. As shown lower lip or hook 806 has an outer surface 806*a* that is undercut such that it does not extend as far outwardly as an outer surface above slot 805 so that the lower lip or hook 806 will not reengage with the handle of the package coupling apparatus after it has been decoupled, or will not get engaged with power lines or tree branches during retrieval to the UAV.

FIG. 6C is a front view of payload retriever 800 shown in FIGS. 6A and 6B. Lower lip or hook 806 is shown positioned beneath slot 808 that is adapted for securing a handle of a payload, such as on a package coupling apparatus of the disclosure.

Figure 7A:
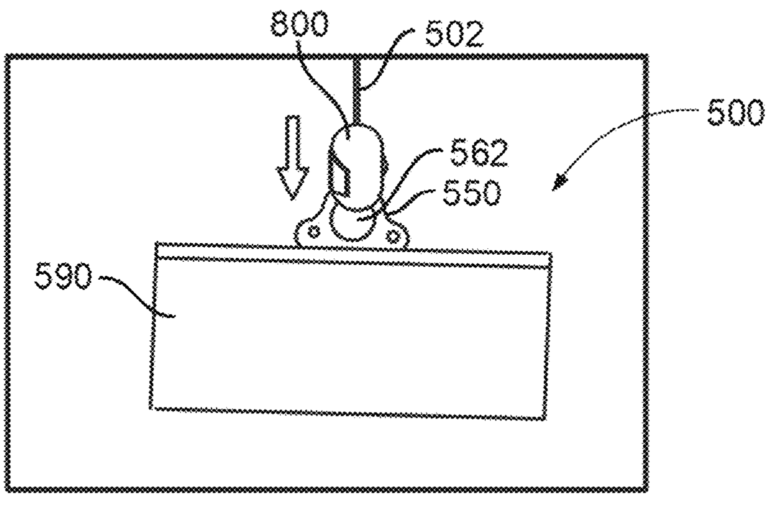
FIGS. 7A-7C show decoupling of a payload retriever from a package, according to an example embodiment.

FIG. 7A shows a side view of a package 500 including a hanger 550 secured within a payload retriever 800. The package 500 and payload retriever 800 are moving downwardly prior to touching down for delivery. The hanger 550 of the package 500 includes a handle opening 562 through which a lower lip or hook of payload retriever 800 extends. The handle sits within a slot of the payload retriever 800, which is suspended from a tether 810 during descent of the package 500 to a landing site.

Figure 7B:
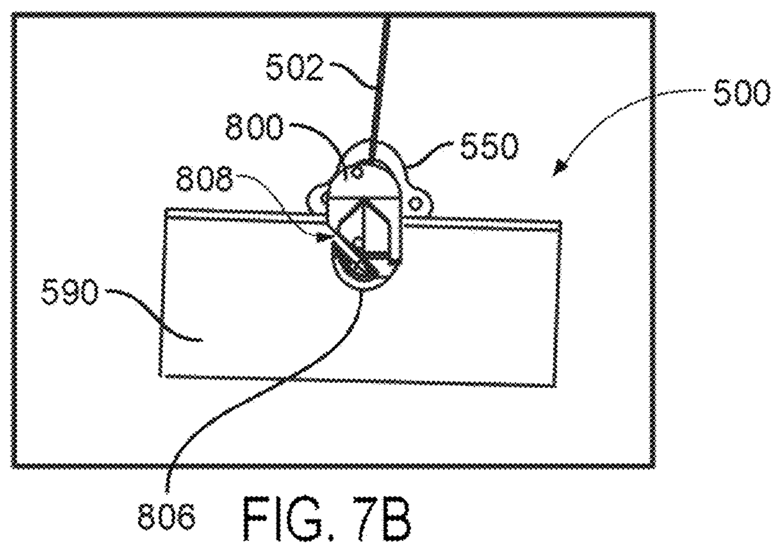

FIG. 7B shows a side view of package 500 after package 500 has landed on the ground and the payload retriever 800 has decoupled from hanger 550 of package 500. Once the package 500 touches the ground, the payload retriever 800 continues to move downwardly (as the winch further unwinds) through inertia or gravity and decouples the hanger 550 from the slot 880 of the payload retriever 800 from hanger 550. The payload retriever 800 remains suspended from tether 810, and can be winched back up to the payload coupling receptacle of the UAV.

Figure 7C:
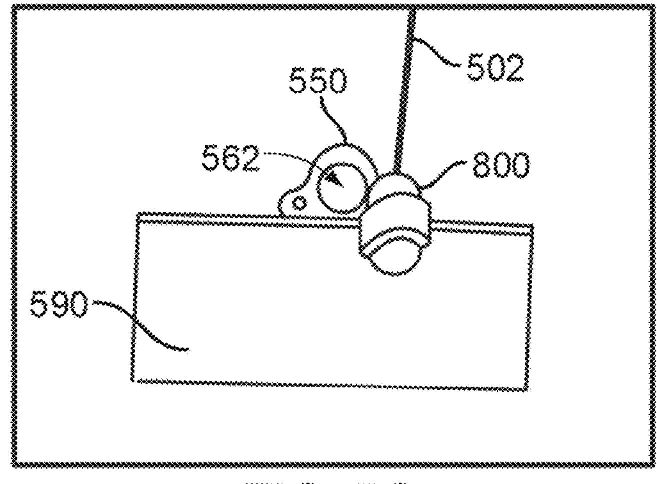

FIG. 7C shows a side view of package 500 with payload retriever 800 moving away from hanger 550 of package 500. Here the payload retriever 800 is completely separated from the handle opening 562 of hanger 550. Tether 810 may be used to winch the payload retriever back to a receptacle positioned in the fuselage of the UAV.

Figure 8:
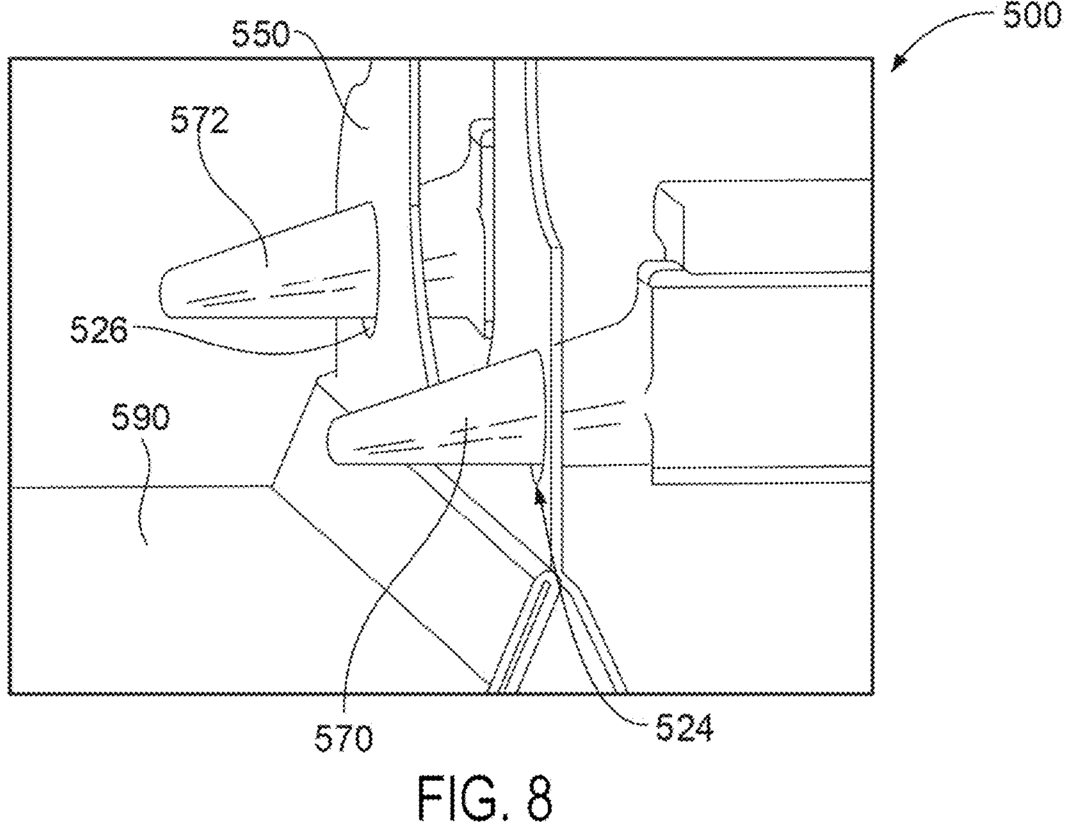
FIG. 8 shows a pair of locking pins extending through a hanger of a package, according to an example embodiment.

FIG. 8 shows a pair of pins 570, 572 extending through holes 524 and 526 in a hanger 550 of a package 500 to secure the hanger 550 within the fuselage of a UAV, or to secure the package 500 to a payload holder of a payload retrieval apparatus. In this manner, the hanger 550 and package 500 may be secured within the fuselage of a UAV, or to a payload holder of a payload retrieval apparatus. In this embodiment, the pins 570 and 572 have a conical shape which allows them to be easily inserted into the holes 524 and 526. so that they pull the package up slightly or at least remove any downward slack present. In some embodiments the pins 570 and 572 may completely plug the holes 524 and 526 of the hanger 550 of package 500, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 9:
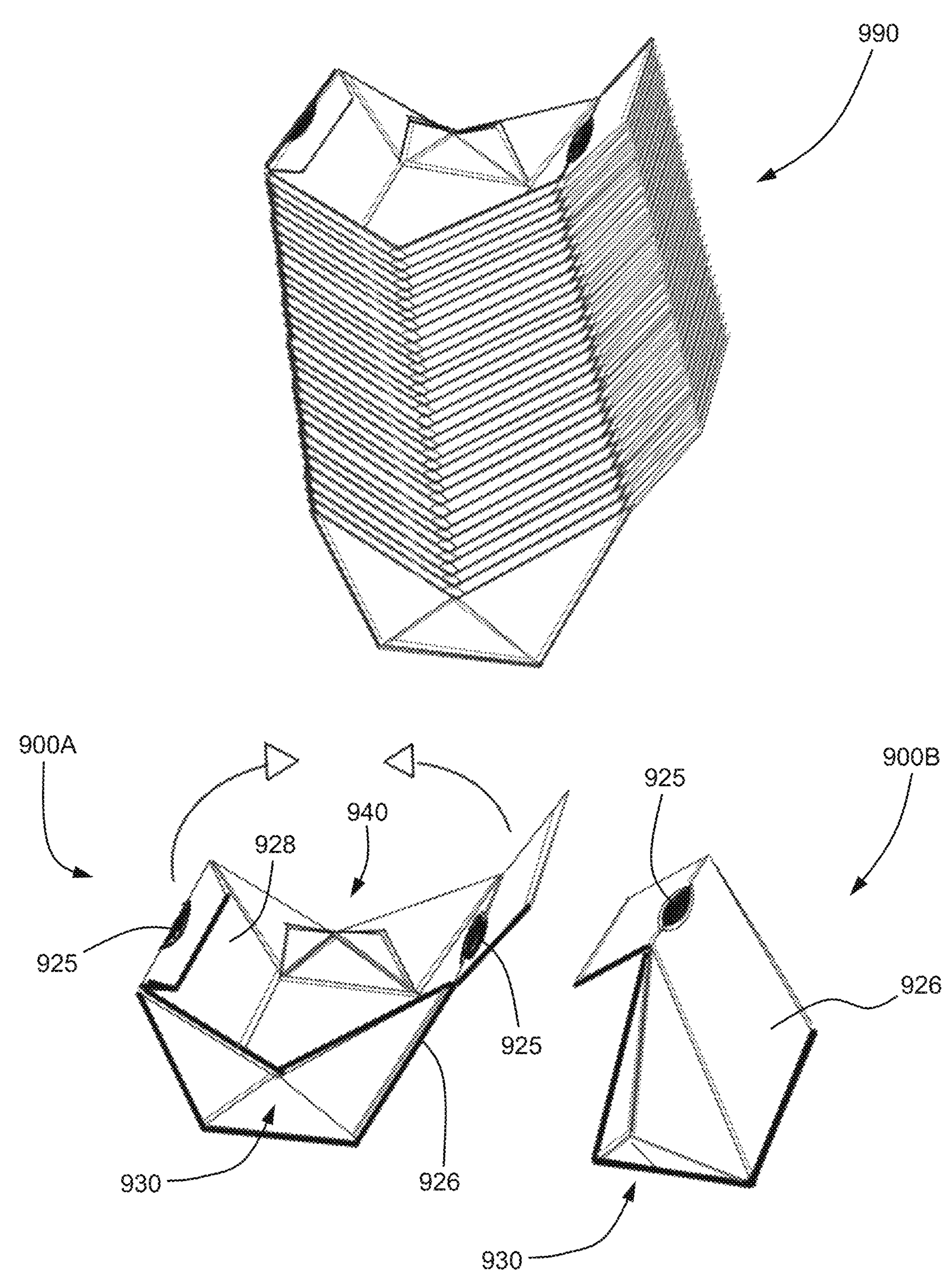
FIG. 9 is a perspective view of a group of packages, according to an example embodiment.

FIG. 9 shows a group of packages 990 that are arranged in a nested stack. A first package 900A has been removed from the stack 990 and is in an open configuration, while a second package 900B has been removed from the stack 990 and closed. The illustrated packages are adapted for use with a UAV. Each of the packages includes a bottom 922, a first side 926, a second side 928, a front 930 and a rear 940 that taper outward when the package 900A is open to allow the package to be nested. When the package is closed, as illustrated by package 900B, the sides 926, 928 extend toward one another, while the front 930 and rear 940 extend to a tip. This closed configuration provides an aerodynamic shape for carrying by a UAV.

The two sides 926, 928 each include a slot 925 that are aligned when the package 900 is in the closed configuration. The slots 925 may receive a hanger, such as hanger 550 described above and shown in FIG. 5. The handle of the hanger may extend through the slot to be accessible by the UAV, while the base of the hanger may be positioned inside the package to prevent its removal. For this purpose, the base may be longer than the slot.

Figure 10A:
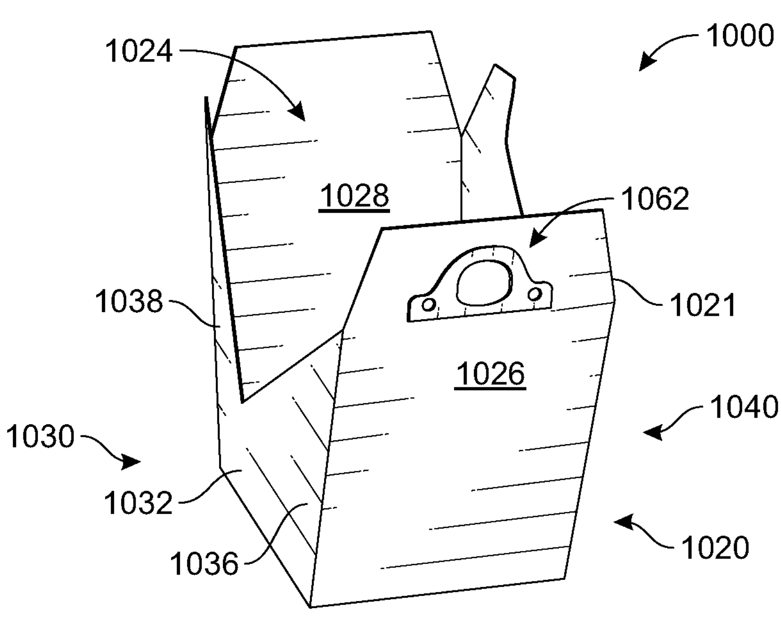
FIG. 10A is a perspective view of a package in an open configuration, according to an example embodiment.
Figure 10B:
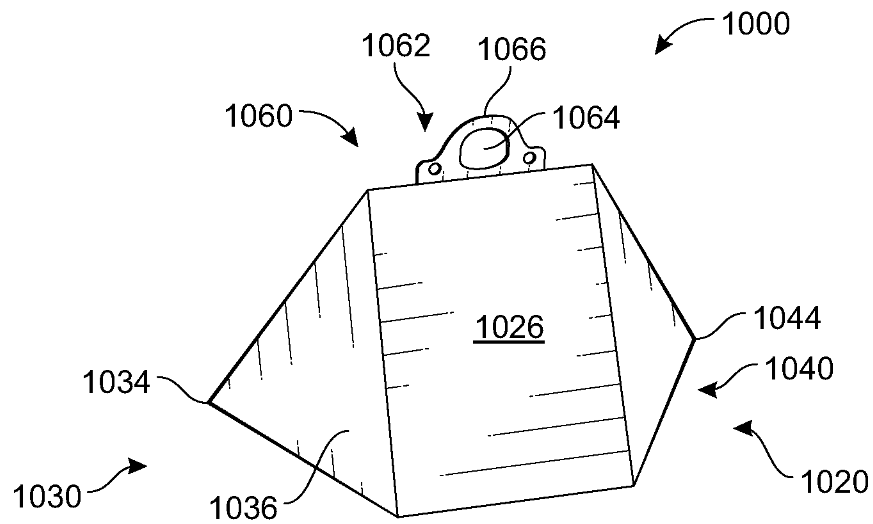
FIG. 10B is a perspective view of the package of FIG. 10A in a closed configuration.

FIGS. 10A and 10B show an embodiment of a package 1000 adapted for use with a UAV. The package 1000 includes a folded sheet of material 1021 that forms a container 1020, which has an open configuration shown in FIG. 10A and a closed configuration shown in FIG. 10B. The container includes a bottom 1022, a first side 1026, a second side 1028, a front 1030, and a back 1040. A handle 1062 is disposed at the top of the first side 1026. As shown in FIG. 10B, the handle includes a handle opening 1064 and a bridge 1066 extending over the handle opening 1064.

In the open configuration, as shown in FIG. 10A, the first side 1026, the second side 1028, the front 1030, and the back 1040 form an opening 1024 opposite the bottom 1022. With the container 1020 open, the first side 1026 and the second side 1028 are angled away from one another from the bottom 1022 toward the opening 1024. Likewise, the front 1030 and the back 1040 are also angled away from one another from the bottom 1022 toward the opening 1024. As a result, the opening 1024 of the container 1020 is wider than the bottom 1022, which allows the container to nest into another container that has the same shape or construction, in a manner similar to the stack of nested containers 990 shown in FIG. 9.

In the closed configuration, as shown in FIG. 10B, the first side 1026 and second side 1028 are angled toward one another so as to surround an interior space in the container 1020. The word surround, as used herein, refers to the encircling enclosure that the first side 1026 and second side 1028 make, in combination with the bottom 1022 around the interior space. As a result of the first side 1026 and second side 1028 being pushed to an inwardly angled position, the front 1030 is pushed forward to a front tip 1034. Similarly, the back 1040 is pushed rearward to a rear tip 1044.

Figure 11:
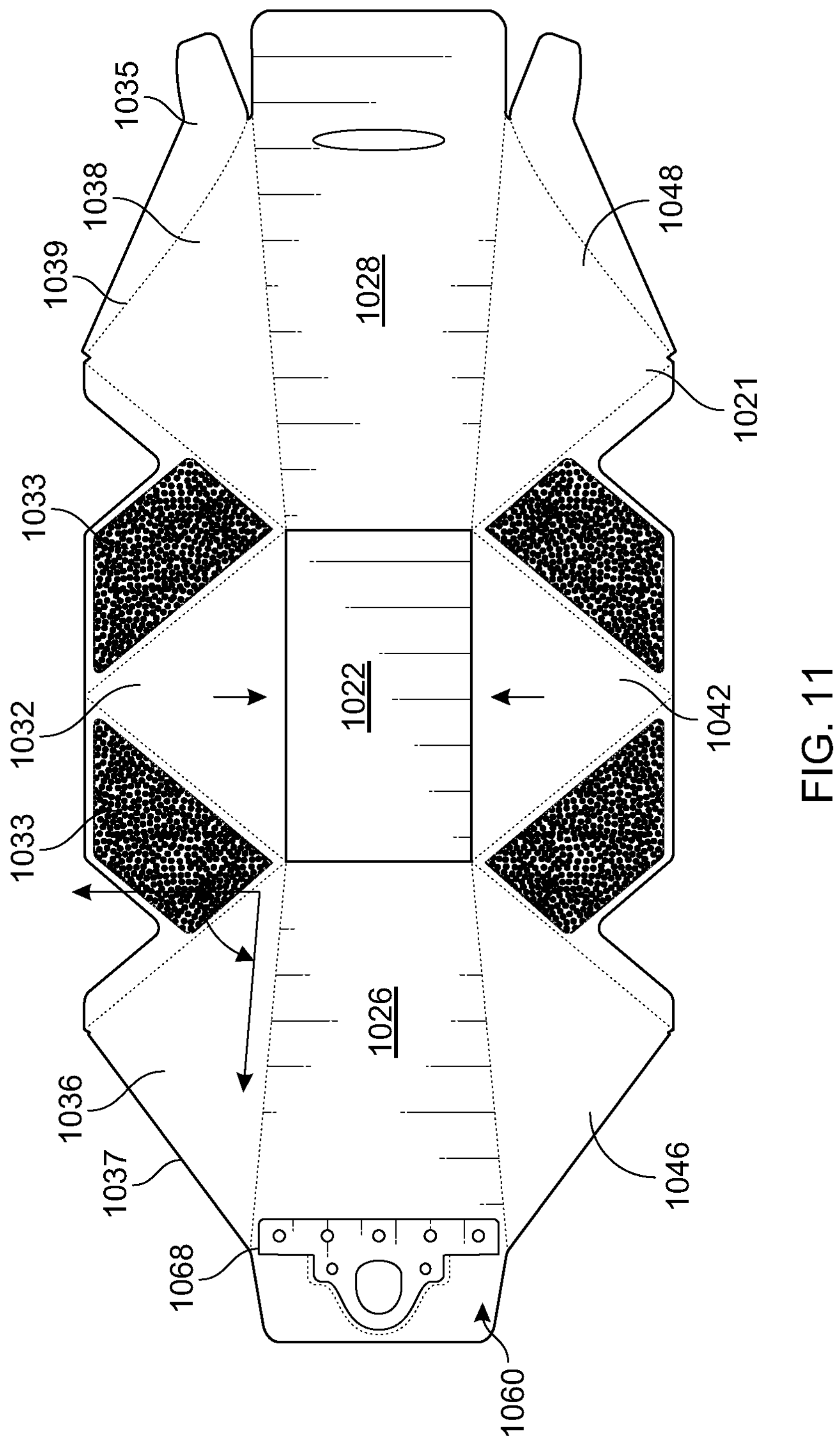
FIG. 11 is a top view of an unfolded sheet of material used to make the package of FIG. 10A.

In some embodiments, the handle is part of a hanger that is formed of a separate material than the folded sheet of material that forms the container. For example, in the embodiment shown in FIGS. 10A, 10B and 11, the handle 1062 is part of a hanger 1060 that includes a base 1068 and the handle 1062 extending up from the base 1068. As shown in FIG. 11, the base 1068 is attached to the first side 1026 of the container.

In some embodiments, the hanger is fixedly attached to the container. For example, the hanger may be secured to the folded sheet of material of the container using an adhesive. Alternatively, depending on the materials of the hanger and the container, the hanger may be heat welded or otherwise bonded to the sheet of material that forms the container. Similarly, the hanger may be secured to the container using a fixed fastener, such as a rivet that passes through apertures in the first side of the container.

In other embodiments, the hanger may be removably attached to the container. For example, the hanger may be secured to the container with removable fasteners, such as clips, snaps, or threaded fasteners. Alternatively, the hanger may be configured to clamp onto the container, using a clamping structure.

Alternatively, in other embodiments, the handle may be integrally formed in the first side of the container. For example, the folded sheet of material may be cut at the top end of the first side of the container to have the shape of a handle. For instance, the first side may be cut to include a bridge extending over a handle opening, in a shape similar to that of the illustrated handle.

In some embodiments, the front and rear of the container are formed by several sections. For example, in the illustrated embodiment of FIGS. 10A and 10B, the front 1030 is formed by a lower front section 1032, a first front side section 1036, and a second front side section 1038. In FIG. 10B, these sections have been pushed outward to the front tip 1034, such that only the first front side section 1036 is visible. However, the various sections can be seen clearly in the unfolded material sheet illustrated in FIG. 11. As shown, the lower front section 1032 extends from the bottom 1022, the first front side section 1036 extends from the first side 1026, and the second front side section 1038 extends from second side 1028. The rear 1040 of container 1020 has a similar configuration and is formed by a lower rear section 1042, a first rear side section 1046, and a second rear side section 1048.

In some embodiments, an upper edge of the first front side section is adjacent to an upper edge of the second front side section when the container is in the closed configuration. For example, when container 1020 is moved into the closed position, as shown in FIG. 10B, the upper edge 1037 (see FIG. 11) of the first front side section 1036 is adjacent to the upper edge 1039 of the second front side section 1038, such that the front 1030 is in the shape of a three-sided pyramid. The sheet of material further includes a flap 1035 extending from the second front side section 1038 that is configured to fold over the upper edge 1037 of the first front side section 1038 to avoid an opening between the adjacent edges 1037, 1038. The sections of the rear 1040 have a similar configuration.

Gaps between the lower edges of the front and rear sections are avoided by connecting pieces 1033 that extend between the lower front section and the respective front side sections. During assembly, these connecting pieces are folded to overlap with the other sections of the front or rear. Further, these connecting pieces may be used to hold the container in its three dimensional position by including adhesive on the overlapping layers. The shading shown in FIG. 11 illustrates such an adhesive.

The container 920 shown in FIG. 9 and the container 1020 shown in FIGS. 10A, 10B and 11 may be formed by a tray making machine. For example, with respect to package 1000, a mandrel may be used to push the sheet of material 1021 into a form that folds folded connecting sections into their overlapping configuration and produces a container having the open configuration shown in FIG. 10A. If the package uses a hanger formed of a separate material, the hanger may be secured to the sheet of material before or after it has been folded into the shape of the container.

Figure 12A:
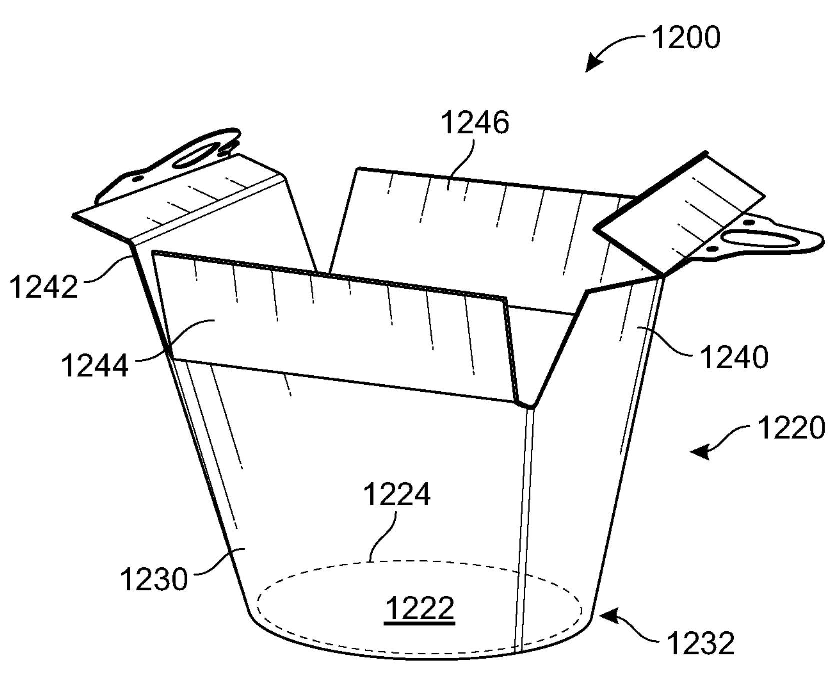
FIG. 12A is a perspective view of a package in an open configuration, according to an example embodiment.
Figure 12B:
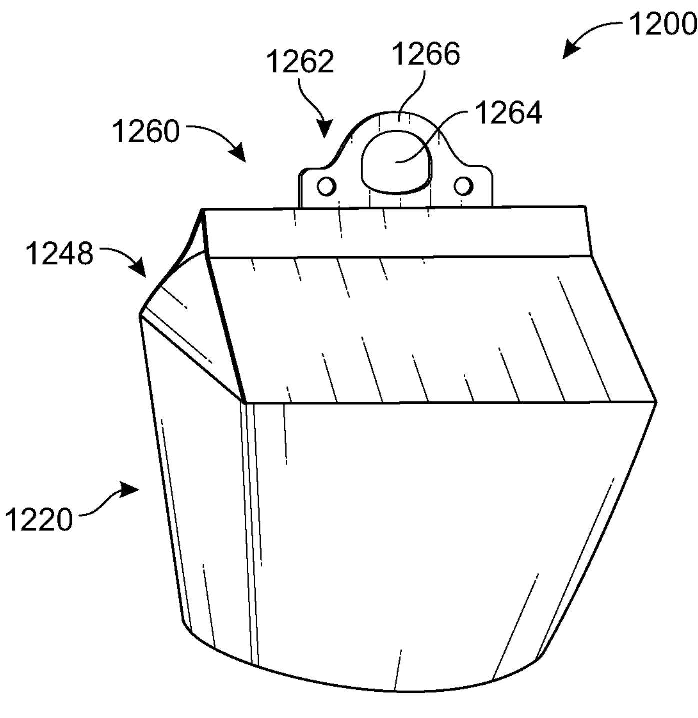
FIG. 12B is a perspective view of the package of FIG. 12A in a closed configuration.

FIGS. 12A and 12B show another embodiment of a package 1200 adapted for use with a UAV. The package includes a container 1220 having a bottom wall 1222, a side wall 1230, and a plurality of flaps 1240, 1242, 1244 and 1246 extending up from the side wall 1030. The side wall 1230 includes a lower end 1232 that surrounds a perimeter 1224 of the bottom wall 1222. The side wall 1230 extends upward from the bottom wall 1222 such that the container 1220 has the configuration of a bucket. By surrounding the bottom wall 1222, the side wall 1230 forms an interior of the container 1220.

The four flaps 1240, 1242, 1244 and 1246 extend upward from respective sides of the container and are adapted to fold inward so as to form a closed vaulted top 1248, as shown in FIG. 12B. The term vaulted, as used herein, refers to the upward trajectory of the top, which increases the interior volume of the container. Thus, in addition to the volume surrounded by the side wall 1230 of the container 1220, the interior of the container also includes the volume that extends into the vaulted top 1248.

The package 1200 also includes a handle 1262 disposed at the top of one of the flaps 1240. The handle 1262 includes a handle opening 1264 and a bridge 1266 extending over the handle opening 1264.

Figure 13A:
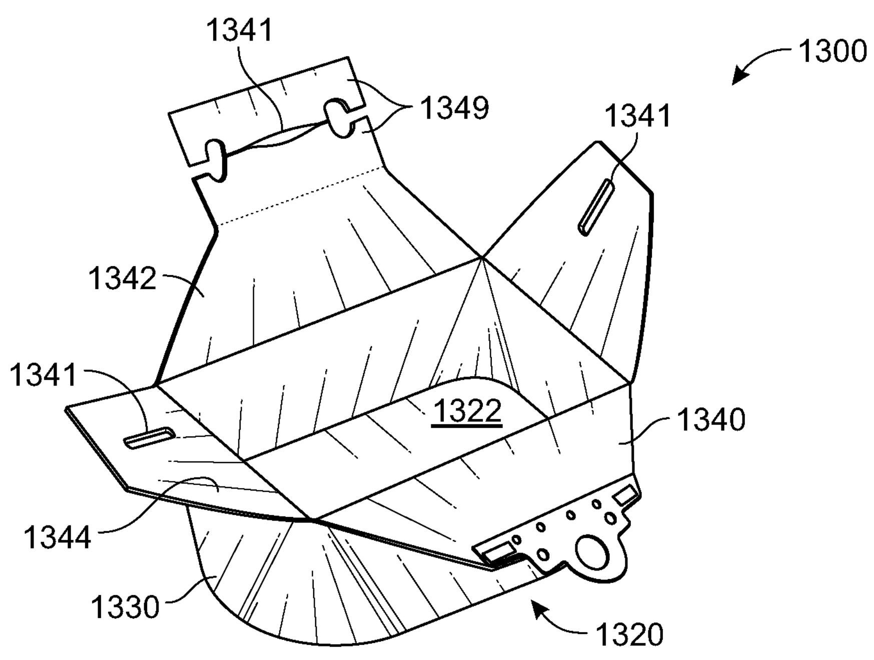
FIG. 13A is a perspective view of a package in an open configuration according to another example embodiment.
Figure 13B:
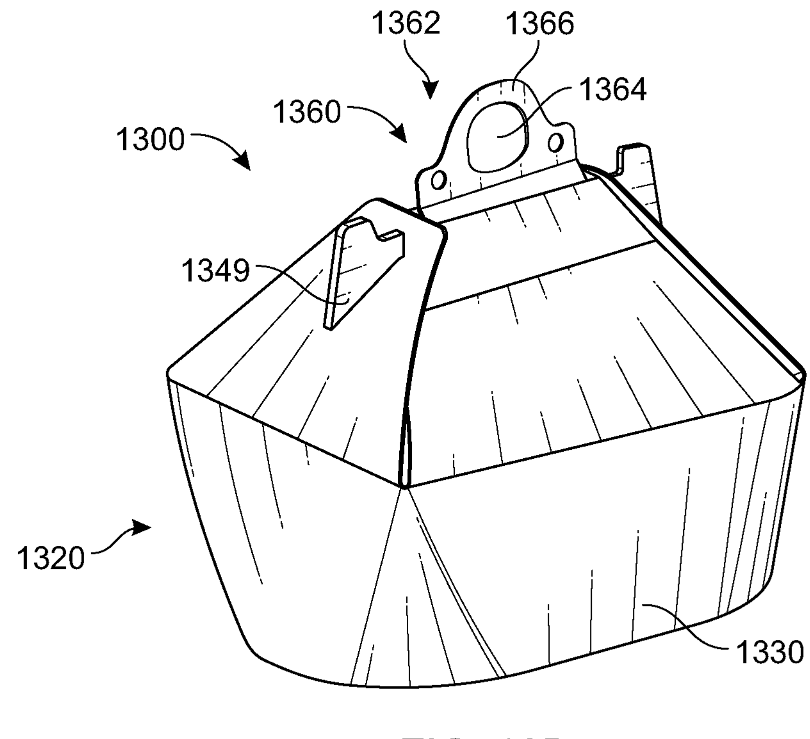
FIG. 13B is a perspective view of the package of FIG. 13A in a closed configuration.

FIGS. 13A and 13B show another package 1300 adapted for use with a UAV that has a bucket configuration. The package includes a container 1320 having a bottom wall 1322, a side wall 1330, and a plurality of flaps 1340, 1342, 1344 and 1346 extending up from the side wall 1030. The bottom 1322 and side wall 1330 are shaped to give the container an oblong configuration, rather than the conical configuration of container 1220. In other embodiments, the container may have other shapes.

The four flaps 1340, 1342, 1344 and 1346 extend upward from respective sides of the container and are adapted to fold inward and have a gabled closure with a vaulted top 1348, as shown in FIG. 13B. Specifically, the second flap 1342 includes a slot 1341 and a plurality of hooks 1349. The second flap 1342 is configured to fold over the hanger 1360 attached to the first flap 1340 so that the hanger 1360 passes through the slot 1341 and the hooks 1349 point upward. The third flap 1344 and fourth flap 1346 each include a respective slot 1345, 1347 that is configured to pass over the hooks 1349 and hold the vaulted top 1348 closed. The hanger 1360 forms a handle 1356 that includes a handle opening 1364 and a bridge 1366 extending over the handle opening 1364.

In some embodiments of a container having a bucket configuration, the handle is part of a hanger that is formed of a separate material than the components forming the container. For example, in the embodiment shown in FIGS. 12A and 12B, the handle 1262 is part of a hanger 1260 that includes a base 1268 and the handle 1262 extending up from the base 1268.

In some embodiments, the hanger is fixedly attached to the container. For example, the hanger may be secured to one of the flaps of the container using an adhesive. Alternatively, depending on the materials of the hanger and the container, the hanger may be heat welded or otherwise bonded to one of the flaps that forms the top of the container. Similarly, the hanger may be secured to the container using a fixed fastener, such as a rivet that passes through apertures in one of the flaps.

In other embodiments, the hanger may be removably attached to the container. For example, the hanger may be secured to one or more of the flaps that form the top of the container using removable fasteners, such as clips, snaps, or threaded fasteners. Alternatively, the hanger may be configured to clamp onto the top of the container, using a clamping structure.

Alternatively, in other embodiments, the handle may be integrally formed in one or more of the flaps of the container. For example, the flaps may be cut at the top end of the first side of the container to have the shape of a handle. For instance, the first side may be cut to include a bridge extending over a handle opening, in a shape similar to that of the illustrated handle.

In some embodiments, the flaps are a continuous extension of the side wall of the container. For example, in the embodiments shown in FIGS. 12A, 12B, 13A and 13B, the flaps are formed in an integral piece of material with the side wall. This configuration produces a simple construction and a reduced number of manufacturing steps. In other embodiments, however, the flaps may be attached to the side wall using adhesive or other means. For example, attaching the flaps to the side wall may allow the side wall to have a rolled top, which may increase stability of the container.

In some embodiments, the bottom of the container is secured to the side wall using adhesive. Further, in some embodiments, the bottom of the container includes a downward flange and the side wall wraps around the flange. For example, the bottom of the container may be slightly offset from the lower end of the side wall, such that the side wall extends slightly below the bottom of the container. The bottom may then include a downwardly extending flange around its perimeter that is used as a surface for attaching the bottom to the side wall with adhesive. Moreover, for added strength, the side wall may wrap under the flange and fold back upward. This may provide both a strong and liquid resistant bottom to the container.

Figures 14A, 14B:
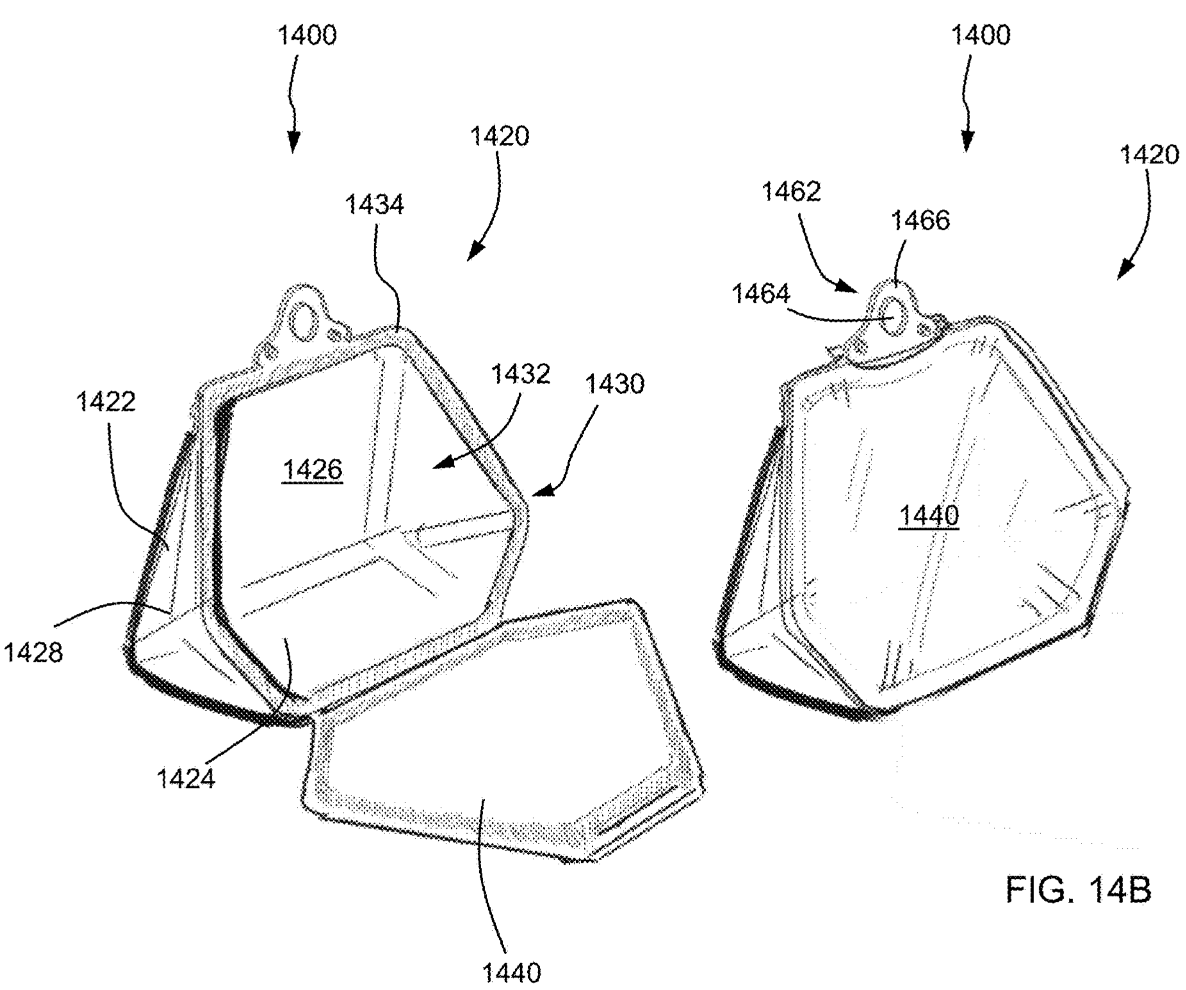
FIG. 14A is a perspective view of a package in an open configuration according to another example embodiment.
FIG. 14B is a perspective view of the package of FIG. 14A in a closed configuration.

FIGS. 14A and 14B illustrate another embodiment of a package adapted for use with a UAV. The package 1400 includes a container 1420 that includes a first portion 1422 and a film 1440. The first portion 1422 has a concave side 1424 that forms an interior area 1426, a convex side 1428, and a first edge 1430. The first edge 1430 extends around an opening 1432 to the interior area 1426 and is disposed in, i.e., lies within, a first plane. In other words, the first edge 1430 of the first portion 1422 is planar and surrounds the opening 1432.

As shown in FIG. 14B, when the package is closed, the film 1440 covers the opening 1432 to the interior area 1426 and is secured to the first edge 1430. For example, the film 1440 may be attached to the first edge 1430 by an adhesive. To facilitate the attachment of the film 1440 to the first edge 1430, the first edge 1430 may include a lip 1434 that extends in the same plane. To open the package 1400, the film 1440 may be peeled away from the lip 1434 that surrounds the opening 1432 of the container 1420.

The package 1400 also includes a handle 1462 disposed at a top of the first portion 1422 of the container 1420. The handle includes a handle opening 1464 and a bridge 1466 extending over the handle opening 1464.

In some embodiments, the handle is integrally formed in the first portion of the container. For example, in package 1400, handle 1462 is integrally formed with the first portion 1422 of the container 1422. Specifically, the handle 1462 extends upward from the lip 1434 of the first edge 1430. In such an embodiment, the handle may be coplanar with the first edge that surrounds the opening of the first portion.

In other embodiments, the handle may be part of a hanger that is formed as a separate part from the container. In such embodiments, the hanger may be fixedly attached to the container or removable. For example, the hanger may be secured to the first portion of the container with adhesive. Alternatively, depending on the materials of the hanger and the container, the hanger may be heat welded or otherwise bonded to part of the first portion of the container. Similarly, the hanger may be secured to the container using a fixed fastener, such as a rivet that passes through apertures in the first portion.

In other embodiments, the hanger may be removably attached to the container. For example, the hanger may be secured to the first portion of the container using removable fasteners, such as clips, snaps, or threaded fasteners. Alternatively, the hanger may be configured to clamp onto the top of the container, using a clamping structure.

FIGS. 15A-15C illustrate steps in the manufacture of another embodiment of a package adapted for use with a UAV. As shown in FIG. 15C, the package 1500 includes a pouch 1520 having a top 1524, a bottom 1522, a first side 1526, a second side 1528, a first edge 1530, and a second edge 1534. The package 1500 also includes a hanger 1560 with a base 1568 and a handle 1562 extending up from the base. The handle 1562 includes a handle opening 1564 and a bridge 1566 extending over the handle opening 1564. The bridge 1566 of the handle 1562 is configured to be secured by a component of a UAV for flight.

The pouch 1520 is formed of a sheet of a flexible first material 1540 that is folded to form a first layer 1546, a second layer 1548, and a folded end 1542. The first layer 1546 forms the first side 1526 of the pouch 1520, the second layer 1548 forms the second side 1528 of the pouch 1520, and the folded end 1542 forms the bottom 1522. To form an enclosed pouch, the first layer 1546 is sealed with the second layer 1548 along the first edge 1530 to form a first seam 1550. Likewise, the first layer 1546 is sealed with the second layer 1548 along the second edge 1534 to form a second seam 1554. Further, the top of the pouch 1520 includes an opening for receiving items that are to be carried in the pouch.

The hanger 1560 positioned at the top of the pouch 1520 is formed by a plurality of sealed layers including the first layer 1546 of the folded material and the second layer 1548 of the folded material. The term sealed, as used herein, includes various configurations for securing layers together, including heat sealing, bonding, or adhering. Thus, the sealed layers may be directly connected, as with heat sealing, or may be sealed with an intermediate layer, such as adhesive. In some embodiments, the hanger is formed by the first and second layers of material alone, while in other embodiments, the hanger is formed by the first and second layers being sealed together with additional layers.

As shown in FIGS. 15A and 15B, to form the hanger, the layers may first be sealed to one another in a way that forms the opposing seams 1550, 1554, as well as the sealed material that will form the hanger, as depicted by the shaded portion of FIG. 15A. The hanger can then be cut out from the sealed layers, as shown in FIG. 15B. Likewise, this cutting step may also be used to separate the package from neighboring packages, for example, where the pouches are formed from a continuous or long sheet of material.

In some embodiments, the first seam, the second seam, and the handle are part of a continuous sealed structure. For example, as shown in FIGS. 15A and 15B, the layers of the folded material are first sealed in a continuous sealed structure 1515 that forms the seams of the pouch and an area of sealed material. The sealed structure 1515 is then cut to form the hanger 1560 in a manner where the hanger extends to the seams in a continuous structure. This continuous sealed structure that extends down the sides of the pouch can help increase the strength of the package.

In some embodiments, the first seam and the second seam taper inward from the bottom of the pouch to the top of the pouch. For example, in package 1500, the first seam 1550 and the second seam 1554 taper inward toward the top of the pouch 1520. While this shape reduces the volume of the interior of the pouch, and is therefore not intuitive, it can also improve the aerodynamic performance of the package 1500, making it an advantage for a pouch 1520 adapted for use with a UAV.

In some embodiments, the pouch includes a closure with a first portion attached to the first side and a second portion attached to the second side. For example, the pouch 1520 includes an enclosure 1510 that includes a first zipper portion secured to the first side of the pouch and a second zipper portion secured to the second side of the pouch.

Further, in some embodiments, a width of the bottom of the pouch is greater than a length of the closure. For example, as shown in FIG. 15B, a portion of the enclosure is removed when the tapered sides of the pouch are cut away. As a result, the width of the bottom 1522 of the pouch 1520, i.e., the distance from the first seam 1550 to the second seam 1554 along the bottom 1520, is greater than the length of the closure 1510. While sacrificing a portion of the enclosure is non-intuitive, it can increase the aerodynamic performance of the pouch, as stated above.

In various embodiments of the package described herein, the handle opening that is used to secure the package to a UAV may be accompanied by holes, such as those illustrated in FIG. 5 and otherwise, for securing the package within a UAV. For example, as explained above, pins may be inserted through the holes to lock the package in place.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A package adapted for use with an uncrewed aerial vehicle (UAV), the package comprising:

a folded sheet of material that forms a container having an open configuration and a closed configuration, the container including a bottom, a first side, a second side, a front, and a back; and a handle disposed at a top of the first side, the handle including a handle opening and a bridge extending over the handle opening, wherein, in the open configuration:

the first side, second side, front, and back extend upward from the bottom to form an opening opposite the bottom, the first side and second side are angled away from one another from the bottom toward the opening, and the front and back are angled away from one another from the bottom toward the opening, such that the container is nestable with another container having the same shape; and wherein, in the closed configuration:

the first side and second side are angled toward one another so as to surround an interior space in the container, the front extends to a front tip, and the rear extends to a rear tip.

2. The package of claim 1, wherein the handle is part of a hanger, the hanger including a base and the handle extending up from the base, and wherein the base of the hanger is attached to the first side of the container.

3. The package of claim 1, wherein the handle is integrally formed in the first side of the container.

4. The package of claim 1, wherein the front is formed by a lower front section extending from the bottom, a first front side section extending from the first side and a second front side section extending from the second side.

5. The package of claim 4, wherein an upper edge of the first front side section is adjacent to an upper edge of the second front side section when the container is in the closed configuration.

6. The package of claim 4, wherein a folded first front connecting section extends from an edge of the lower front section to an edge of the first front side section.

7. The package of claim 4, wherein in the closed configuration, the front is in the shape of a three-sided pyramid formed by the lower front section, the first front side section, and the second front side section.

8. The package of claim 4, further comprising a flap extending from the second front side section, wherein the flap is configured to fold over an upper edge of the first front side section to cover an opening between the first front side section and the second front side section when the container is in the closed configuration.

9. The package of claim 2, wherein the first side of the container includes a slot, and wherein the base of the hanger is positioned inside the container and is longer than the slot to prevent the hanger from being removed through the slot when the bridge is secured by the UAV.

10. A method of preparing a package for delivery by an uncrewed aerial vehicle (UAV), the method comprising:

providing a container formed of a folded sheet of material in an open configuration, the container including a bottom, a first side, a second side, a front, and a back, wherein, in the open configuration:

the first side, second side, front, and back extend upward to form an opening opposite the bottom, the first side and second side are angled away from one another from the bottom toward the opening, and the front and back are angled away from one another from the bottom toward the opening, such that the container is nestable with another container having the same shape;

inserting a payload into an interior of the container through the opening; and folding the container into a closed configuration by angling the first side and the second side toward one another so as to surround an interior space in the container.

11. The method of claim 10, wherein folding the container into closed position pushes the front forward to a front tip, and pushes the back rearward to a rear tip.

12. The method of claim 10, further comprising removing the container from a nested stack of containers.

13. The method of claim 10, such that a handle including a handle opening and a bridge extending over the handle opening is disposed at a top of the first side.

14. The method of claim 10, wherein the handle is part of a hanger, the hanger including a base and the handle extending up from the base, and wherein the base of the hanger is attached to the first side of the container.

15. The method of claim 10, wherein the handle is integrally formed in the first side of the container.

16. The method of claim 10, wherein the front is formed by a lower front section extending from the bottom, a first front side section extending from the first side and a second front side section extending from the second side.

17. The method of claim 16, wherein an upper edge of the first front side section is adjacent to an upper edge of the second front side section when the container is in the closed configuration.

18. The method of claim 16, wherein a folded first front connecting section extends from an edge of the lower front section to an edge of the first front side section.

* * * * *